United States Patent [19]
Shippy et al.

[11] Patent Number: 6,061,780
[45] Date of Patent: May 9, 2000

[54] EXECUTION UNIT CHAINING FOR SINGLE CYCLE EXTRACT INSTRUCTION HAVING ONE SERIAL SHIFT LEFT AND ONE SERIAL SHIFT RIGHT EXECUTION UNITS

[75] Inventors: David Shippy, Bellaire; Jerald G. Leach, Richmond, both of Tex.

[73] Assignee: Texas Instruments Incorporated, Dallas, Tex.

[21] Appl. No.: 09/012,324

[22] Filed: Jan. 23, 1998

Related U.S. Application Data

[60] Provisional application No. 60/036,400, Jan. 24, 1997.

[51] Int. Cl.[7] .............................. C06F 9/30; C06F 9/312; C06F 9/40; C06F 9/315
[52] U.S. Cl. ......................... 712/204; 712/22; 712/508; 712/241; 712/32; 713/502
[58] Field of Search .............................. 712/23, 24, 241, 712/32, 22, 204; 714/200; 708/209, 508, 524; 395/501

[56] References Cited

U.S. PATENT DOCUMENTS

| | | | |
|---|---|---|---|
| 5,269,007 | 12/1993 | Hanawa et al. ........................ | 712/218 |
| 5,526,296 | 6/1996 | Nakahara et al. ....................... | 708/209 |
| 5,669,010 | 9/1997 | Duluk, Jr. ................................. | 712/22 |
| 5,701,517 | 12/1997 | Carpenter ................................. | 708/209 |
| 5,805,875 | 9/1998 | Asanovic ................................. | 712/200 |

*Primary Examiner*—Meng-Ai T. An
*Assistant Examiner*—Walter Benson
*Attorney, Agent, or Firm*—J. Dennis Moore; Wade James Brady, III; Richard L. Donaldson

[57] ABSTRACT

A VLIW microprocessor capable of executing two or more instructions having data dependency in a single cycle. The microprocessor includes an instruction fetch and decode unit, a register file, and a plurality of execution units communicating with the instruction fetch and decode unit and with the register file. At least two of the execution units are connected such that the output of a first one of the two execution units is connected to the input of a second one of the two execution units, such that the output of the first execution unit is available as an input to the second execution unit during said single cycle, and such that both execution units can execute in said single cycle. In an exemplary embodiment, the first execution unit is a shift left unit, and the second execution unit is a shift right unit. With this embodiment, a complete extract operation can be performed in a single cycle.

2 Claims, 3 Drawing Sheets

EXECUTION UNIT CHAINING FOR SINGLE CYCLE EXTRACT INSTRUCTION HAVING ONE SERIAL SHIFT LEFT AND ONE SERIAL SHIFT RIGHT EXECUTION UNITS

This application claims priority under 35 USC 119 (c)(1) of provisional application number 60/036,400, filed Jan. 24, 1997.

TECHNICAL FIELD OF THE INVENTION

This invention relates to microprocessors, and particularly relates to architectures of very long instruction word processors.

BACKGROUND OF THE INVENTION

Microprocessor designers have increasingly endeavored to exploit parallelism to improve performance. One parallel architecture that has found application in some modern microprocessors, including digital signal processors, is the very long instruction word, or VLIW, architecture. VLIW architecture microprocessors are called that because they handle VLIW format instructions.

A VLIW format instruction is a long fixed-width instruction that encodes multiple concurrent operations. VLIW systems use multiple independent functional units. Instead of issuing multiple independent instructions to the units, a VLIW system combines the multiple operations into one very long instruction. In a VLIW system, computer instructions for multiple integer operations, floating point operations, and memory references may be combined in a single, wide, VLIW instruction.

Thus, a VLIW machine consists of multiple independent functional units controlled on a cycle-by-cycle basis by a VLIW format instruction (62 or more bits). All of the functional units can be arbitrarily pipelined, i-e., they can start a new operation every cycle and take a fixed number of cycles to complete an operation, although the number of cycles for completion can vary from one functional unit to another. The pipeline stages of all units operate in lock step, controlled by a single global clock. The VLIW instruction is the concatenation of a plurality of operation subfields, one for each functional unit to be controlled.

All functional units are connected to a shared multiport register file from which they take their operands and into which they write their results. Any previously computed result can therefore be used as the operand for any functional unit. A VLIW instruction is loaded every cycle. Each functional unit is controlled during that cycle by its own operation subfield which identifies the source and the destination locations in the multi-port register file, and the operation to be started. A typical architecture includes a plurality of arithmetic and logic units, a plurality of memory interface units and a branching control unit. All three of these types of functional units are typically pipelined to maximize the speed of operation.

While VLIW microprocessors are capable of providing greatly improved performance, as compared with other, less parallelized microprocessors, it is desirable to improve the performance of such devices. One problem area for performance arises from the types of instructions that are packed together to form a VLIW instruction. The theory of VLIW operation is that the compiler selects operations that can be executed in parallel to combine into a single VLIW instruction. Therefore, dependent instructions must be executed in sequential cycles. This can result in inefficiencies in the utilization of the microprocessor.

The present invention overcomes such inefficiencies.

SUMMARY OF THE INVENTION

The present invention provides a VLIW microprocessor capable of executing two or more instructions having data dependency in a single cycle. The microprocessor includes an instruction fetch and decode unit, a register file, and a plurality of execution units communicating with the instruction fetch and decode unit and with the register file. At least two of the execution units are connected such that the output of a first one of the two execution units is connected to the input of a second one of the two execution units, such that the output of the first execution unit is available as an input to the second execution unit during said single cycle, and such that both execution units can execute in said single cycle. In an exemplary embodiment, the first execution unit is a shift left unit, and the second execution unit is a shift right unit. With this embodiment, a complete extract operation can be performed in a single cycle.

These and other features of the invention that will be apparent to those skilled in the art from the following detailed description of the invention, taken together with the accompanying drawings.

DETAILED DESCRIPTION OF THE PREFERRED EMBODIMENT

Figure 1:
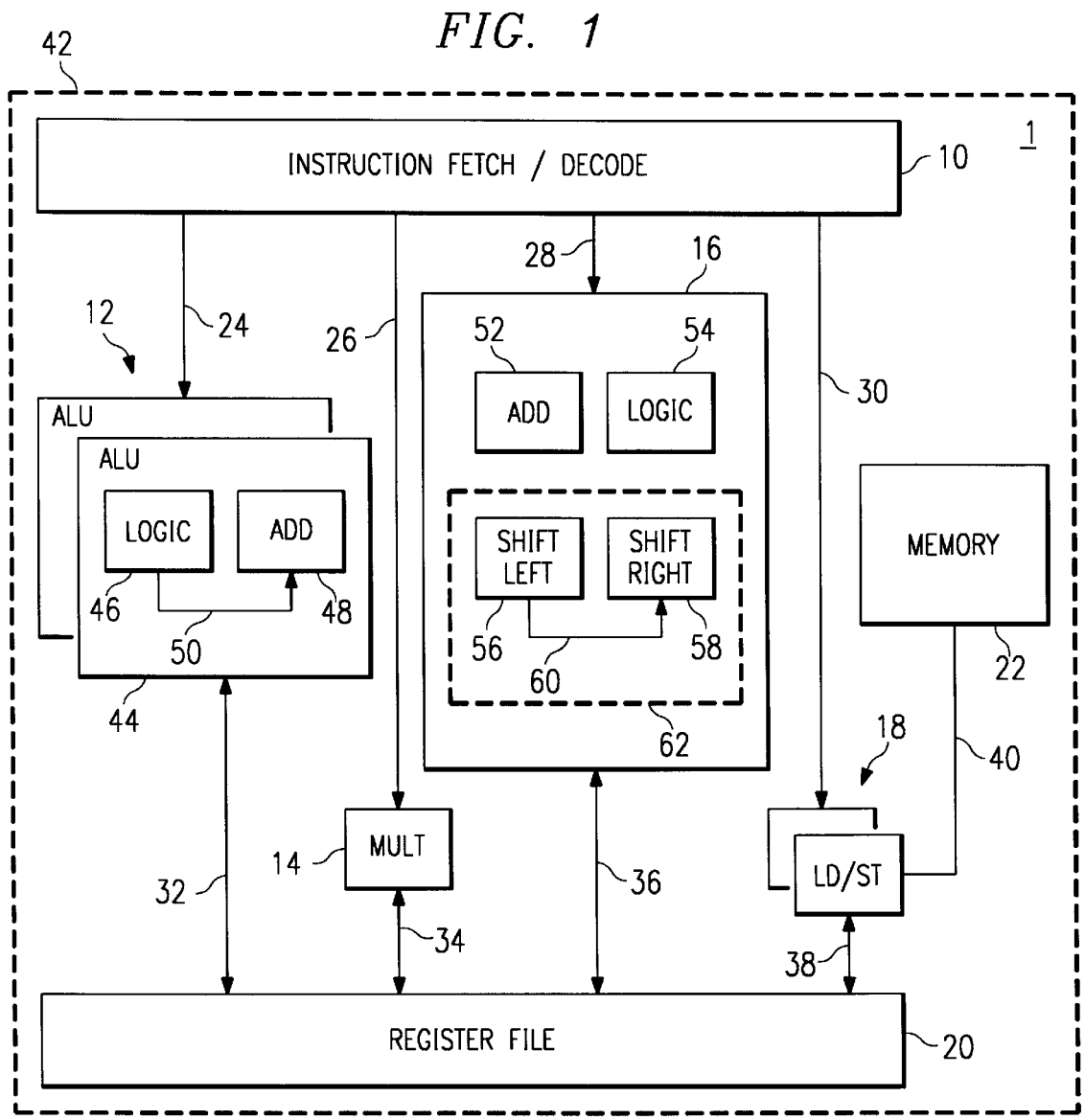
FIG. 1 is a block diagram of a digital signal processor, showing components thereof pertinent to the preferred embodiment of the present invention.

FIG. 1 is a block diagram of a microprocessor 1 of the preferred embodiment of the present invention. The microprocessor 1 is a VLIW digital signal processor ("DSP"). In the interest of clarity, FIG. 1 only shows those portions of microprocessor 1 that are relevant to an understanding of the preferred embodiment of the present invention. Details of general construction for VLIW DSPs are well known, and may be found readily elsewhere. Details of portions of microprocessor 1 relevant to the preferred embodiment of the present invention are explained in sufficient detail hereinbelow, so as to enable one of ordinaiy skill in the microprocessor art to make and use the invention.

In microprocessor 1 there are shown an instruction fetch/decode unit 10, a plurality of execution units, including a group of arithmetic logic units ("ALUs") 12, a multiplier 14, an ALU/shifter unit 16, a group of load/store units 18, a shared multiport register file 20 from which data are read and to which data are written, and a memory 22. Decoded instructions are provided from the instruction fetch/decode unit 10 to the ALUs 12 over a first set of control lines 24, to the multiplier 14 over a second set of control lines 26, to the ALU/shifter unit 16 over a third set of control lines 28 and to the load/store units 18 over a fourth set of control lines 30. Data are provided to/from the register file 20 from/to the ALUs 12 over a first set of busses 32, to the multiplier 14 over a second set of busses 34, to the ALU/shifter unit 16 over a third set of busses 36 and to the load/store units 18 over an fourth set of busses 38. Data are provided to/from the memory 22 from/to the load/store units 18 via a fifth set of busses 40.

Note that the memory 22 is shown in FIG. 1 to be a part of the microprocessor 1 integrated circuit, the extent of which is represented by the dashed line box 42. The memory 22 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

Note also that one ALU 44 of the group of ALUs 12 includes a logic unit 46 and an adder 48, wherein the output of the logic unit 46 is connected directly to the input of the adder 48 via connection lines 50. Furthermore, the ALU/shifter unit 16 includes an adder 52, a logic unit 54, a shift left unit 56 and a shift right unit 58, wherein the output of the shift left unit 56 is connected directly to the input of the shift right unit 58 via connection lines 60. Together, the shift left unit 56 and the shift right unit 58 comprise a shift/extract unit 62.

The significance of the connected operational units internal to ALU 44 and to the ALU/shifter unit 16, just mentioned, is described hereinbelow. As was mentioned above, a VLIW compiler examines a program and finds all instructions with no dependencies, strings them together and executes them in parallel during a single cycle on a large array of execution units, such as execution units 12, 14, 16 and 18. In the prior art, if data dependencies are detected by the compiler, then several execution units may remain idle during a cycle. In the preferred embodiment, shown in FIG. 1, a VLIW architecture is presented which extends VLIW by chaining together the output of one execution unit with the input of another execution unit, allowing single cycle execution of data-dependent instructions.

Consider the following code sequence:

```
SHL .S1 A3, A2, A1
SHR .S1 A1, A4, A5
``` in which SHL is the mnemonic for a shift left operation, to be performed, e.g., in shift left unit 56, and SHR is the mnemonic for a shift right operation, to be performed, e.g., in shift right unit 58. Terms A1, A2, A3, A4 and A5 identify registers that are located in the register file 20. These registers are not shown explicitly in the figures, as their exact location is not relevant to the invention. They are connected conventionally to the execution units as mentioned above. The contents of these registers are provided to/from ALU/shifter unit 16 via bus 36. In the shift left operation (SHL), the operand in source register A3 is shifted left by the amount specified by the operand in source register A2. This is followed by the shift right operation (SHR), in which the operand in source register A1 is shifted right by the amount specified by the operand in source register A4, and the result is put in destination register A5. This code can be used to extract a bit field from a string by first shifting the bit field left and then shifting right to the least significant bits.

As can be seen, the SHR instruction depends on the result of the SHL instruction stored in A1. These two instructions normally take at least two clock cycles in typical VLIW microprocessors, due to this data dependency. However, in accordance with the principles of the present invention, they are combined into a single extract instruction, which may be designated by the mnemonic EXT, for example, by chaining the shift left unit 56 with the shift right unit 58, that is, by having the shift left unit 56 feed the result directly to the shift right unit 58 over lines 60. In this way, an EXT instruction executes in a single clock cycle.

Figure 2:
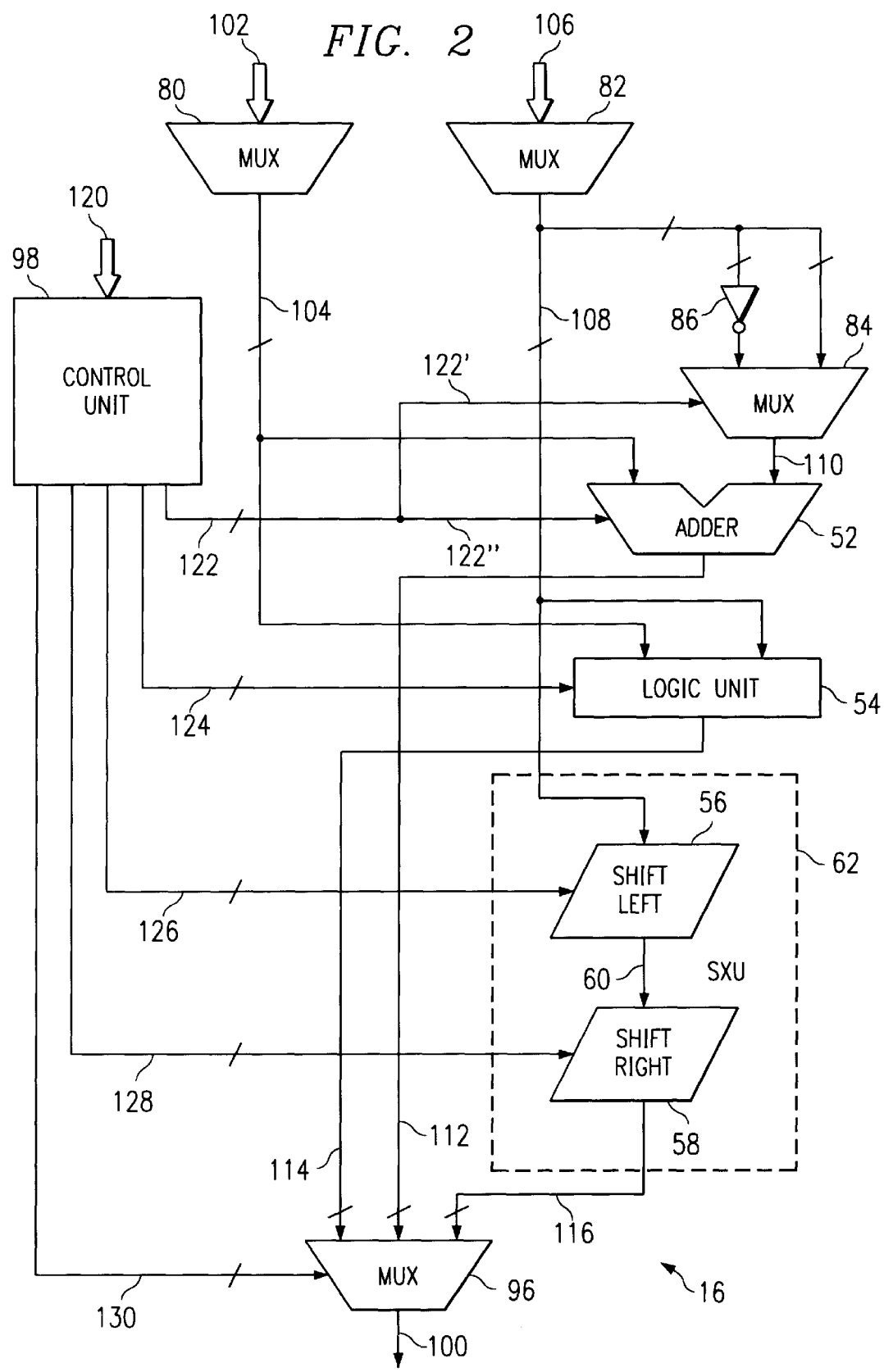
FIG. 2 is a logic diagram of the ALU/shifter unit of FIG. 1.

FIG. 2 is a logic diagram of the ALU/shifter unit 16, showing the internal components thereof. Included are a first multiplexer ("MUX") 80, a second multiplexer ("MUX") 82, a third multiplexer ("MUX") 84, an inverter 86, an adder 52, a logic unit 54, a shift left unit 56, a shift right unit 58, a fourth multiplexer 96, and a control unit 98. Together, the shift left unit 56 and the shift right unit 58 comprise a shift/extract unit 62.

Figure 3:
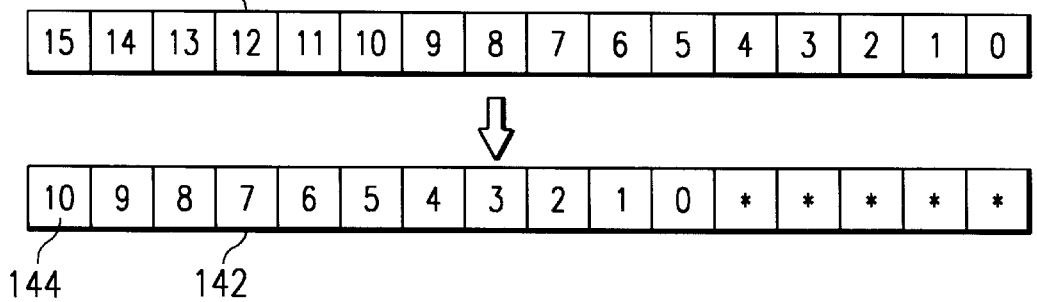

Note that the shift/extract unit 62 performs left and right shifts, as well as extract operations, discussed briefly above. In a left shift operation, the operand is shifted left, i.e., in the direction of the most significant bits ("MSBs"), by an amount specified in the left shift instruction. This is illustrated in FIG. 3, which depicts a shift left by five, of a sixteen bit operand. The numbers in the blocks identify bits, i.e., the "0" represents the "0th" bit, the "1" represents the "1st" bit, etc. up through the "15th" bit, or MSB. The upper box 140 represents the unshifted operand, while the lower box 142 represents the operand after the shift operation. As can be seen, after the shift the 10th bit occupies the MSB position 144. It will be noted that the five LSB positions each have a "*" in them. These bit positions have a value of 0. In a shift operation, positions left unoccupied as a result of the shift are typically filled with 0s.

Figure 4:
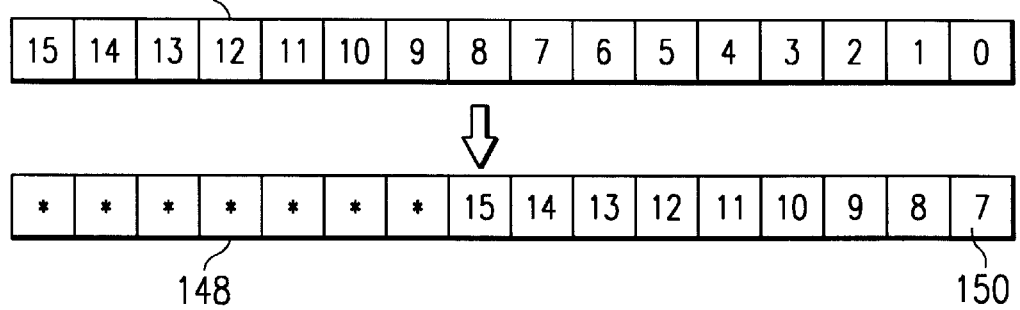

In a right shift operation, the operand is shifted right, i.e., in the direction of the least significant bits ("LSBs"), by an amount specified in the right shift instruction. This is illustrated in FIG. 4, which depicts a shift right by seven, of a sixteen bit operand. As in FIG. 3, the upper box 146 represents the unshifted operand, while the lower box 148 represents the operand after the shift operation. As can be seen, after the shift the 7th bit occupies the LSB position 150. It will be noted that the seven MSB positions each have a "*" in them. Similar to FIG. 3, these bit positions have a value of 0.

Figure 5:
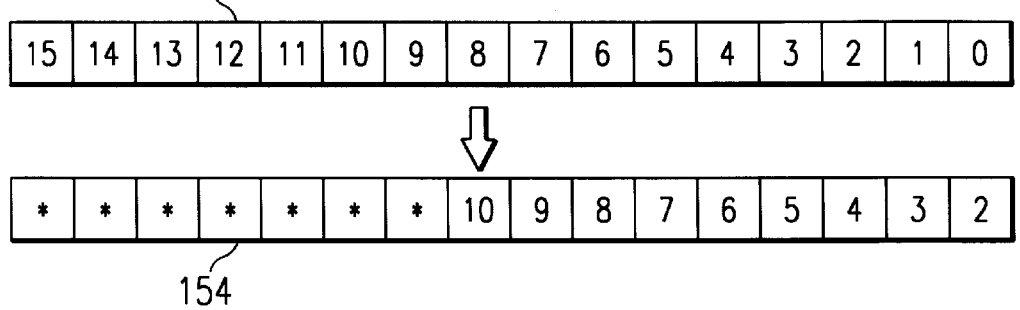

In an extract instruction, a field of contiguous bits, numbering less than the number of bits in the operand, is extracted from the operand. The extract operation is accomplished by, first, shifting the operand left by the number of bits to the left of the field to be eliminated, and, second, shifting the operand right by the number of bits to the right of the field to be eliminated, plus the number of bits the operand was shifted left. The result is the extracted field, aligned at the LSB. This is illustrated in FIG. 5, which depicts an extraction from the operand shown in box 152 of the 2nd through 10th bits to yield the result shown in box 154. Thus, the five bits to the left of the field being extracted are eliminated, as are the two bits to the right of the field being extracted. To accomplish this, the operand in box 152 was first shifted left by five bits, and then shifted right by five plus two, or seven, bit positions to yield the result shown in box 154. As in the shift operation, positions left unoccupied as a result of the extract are typically filled with 0s, as shown by the "*" symbols in the MSB bit positions in box 154.

Returning now to FIG. 2, the MUX 80 receives as inputs a first set of multiple busses 102 from a first set of respective multiple registers (not shown) in the register file 20 (FIG. 1), for selecting one of those busses to connect to lines 104. Lines 104, in turn, connect to one input of the adder 52 and to one input of the logic unit 54.

Likewise, the MUX 82 receives as inputs a second set of multiple busses 106 from a second set of respective multiple registers (not shown) in the register file 20 (FIG. 1), for selecting one of those busses to connect to lines 108. Lines 108, in turn, connect to one input of the MUX 84 and, through the inverter 86, to a second input of the MUX 84. Lines 108 also connect to a second input of the logic unit 54 and to the input of the shift/extract unit 62.

The first set of multiple busses 102 and the second set of multiple busses 106 are part of the third set of busses 36 of FIG. 1.

The output of the MUX 84 connects, via lines 110, to a second input of the adder 52. The output of adder 52 connects, via lines 112, to a first input of MUX 96. The output of the logic unit 54 connects, via lines 114, to a second input of the MUX 96. The output of the shift left unit 56 connects, via lines 60, to the input of the shift right unit 58. The output of the shift/extract unit 62 connects, via lines 116, to a third input of the MUX 96. The output of MUX 96 connects to a bus 100 which, in turn, connects to the register file 20 (FIG. 1). The bus 100 is part of the third set of busses 36 of FIG. 1.

The control unit 98 receives as inputs a set of control signal lines 120 from the instruction fetch/decode unit 10 (FIG. 1). The control unit 98 provides as a first output control line 122, which connects to a control input of the adder 52, and a subset of which 122' connects to a control input of MUX 84. The control unit 98 provides as a second output control line 124, which connects to a control input of the logic unit 54. The control unit 98 provides as a third output control line 126, which connects to a control input of the shift left unit 56 of the shift/extract unit 62. The control unit 98 provides as a fourth output control line 128, which connects to a control input of the shift right unit 58 of the shift/extract unit 62. Finally, the control unit 98 provides as a fifth output control line 130, which connects to a control input of the MUX 96.

The ALU/shifter unit 16 of FIG. 2 operates as follows. Operands from the register file 20 (FIG. 1) are provided on multiple busses 102 and 106, where they are selected by MUXes 80 and 82, respectively, under control of control signals (not shown) from the instruction fetch/decode unit 10 (FIG. 1) to be operated on by ALU/shifter unit 16. These selected operands are placed on lines 104 and 108, respectively.

Now, where two operands are so placed on lines 104 and 108, the operands may be operated on by the ALU/shifter unit 16 by being added or subtracted, or by being operated on by a logical, Boolean function, such as AND, OR or XOR. In such cases in the description below, an operand on lines 104 is referred to as the "first" operand, while an operand on lines 108 is referred to as the "second" operand.

Alternatively, an operand placed on lines 108 may be shifted left, shifted right, or have a field extracted from it. In such operations any value that may be on lines 104 is not operated on.

Control of all of the above-described operations of the ALU/shifter unit 16 is by the control unit 98, which itself receives decoded control signals from the instruction fetch/decode unit 10. The control unit 98 interprets such decoded control signals, and places execution unit control signals on one or more of lines 122, 124, 126, 128 and 130, as described in more detail below.

In the case of an addition, the control unit 98 places signals on lines 122 signaling to adder 52 to perform an addition operation. Lines 122 comprise two signal lines, line 122' and line 122", both of which are provided as control inputs to adder 52. Line 122' is also routed to the MUX 84 as line 122'. An addition operation is signaled by the value "11" on these two lines. A value of "1" on line 122" signals the adder 52 to perform an operation in the present cycle. A value of "0" on line 122" signals the adder 52 to perform no operation in the present cycle.

When line 122" is at a value of "1", a value of "1" on line 122' causes the adder to perform an addition operation. The value "1" on line 122' also controls MUX 84 to select the input thereof carrying the uninverted second operand value, on line 108, to output on lines 110 to one input of adder 52. The first operand, on lines 104, is thus added with the second operand, on lines 110. The result of the addition operation is placed on lines 112. Simultaneously, control unit 98 places signals on lines 130 to control the MUX 96 to select line 112 to connect with the output bus 100.

When line 122" is at a value of "1", a value of "0" on line 122' causes the adder to perform an addition operation with a carry-in of "1". The value "0" on line 122' also controls MUX 84 to select the input thereof carrying the output of inverter 86, i.e., the inverted second operand value, to output on lines 110 to one input of adder 52. The first operand, on lines 104, is thus subtracted with the second operand, on lines 108. The result of the subtraction operation is placed on lines 112. Simultaneously, control unit 98 places signals on lines 130 to control the MUX 96 to select line 112 to connect with the output bus 100.

In the case of a Boolean operation, the control unit 98 places signals on lines 124 signaling to logic unit 54 to perform a selected Boolean operation, such as AND, OR or XOR, on the first and second operands on lines 104 and 108, respectively. The result of the selected Boolean operation is place on lines 114. Simultaneously, control unit 98 places signals on lines 130 to control the MUX 96 to select line 114 to connect with the output bus 100.

In the case of a shift left operation, the control unit 98 places signals on lines 126 signaling to shift left unit 56 to perform a shift left operation, and providing the number of bit positions for the shift. Simulteously, the control unit 98 places signals on lines 128 signaling to shift right unit 58 to perform a shift right operation, and providing a "0" as the number of bit positions for the right shift. That is, the output of shift left unit 56 is placed on lines 60 and then simply passed through, unchanged, shift right unit 58. The shift left operation is performed only on the second operand, on lines 108. The result of the shift left operation is placed on lines 116. Simultaneously, control unit 98 places signals on lines 130 to control the MUX 96 to select line 116 to connect with the output bus 100.

In the case of a shift right operation, the control unit 98 places signals on lines 128 signaling to shift right unit 58 to perform a shift right operation, and providing the number of bit positions for the shift. Simulteously, the control unit 98 places signals on lines 126 signaling to shift left unit 56 to perform a shift left operation, and providing a "0" as the number of bit positions for the left shift. That is, the second operand, on lines 108, is simply passed through, unchanged, shift left unit 56. The output of shift left unit is placed on lines 60 which provide it to the shift right unit 58. The shift right operation is performed only on the second operand, on lines 108. The result of the shift right operation is placed on lines 116. Simultaneously, control unit 98 places signals on lines 130 to control the MUX 96 to select line 116 to connect with the output bus 100.

In the case of an extract operation, the control unit 98 places signals on lines 126 signaling to shift left unit 56 to perform a shift left operation, and providing the number of bit positions for the shift. The number of bit positions equals the number of bits to the left of the field to be extracted, i.e., the number of MSBs to be excluded. Simulteously, the control unit 98 places signals on lines 128 signaling to shift right unit 58 to perform a shift right operation, and providing the number of bit positions for the shift. The number of bit positions equals the number of bits to the right of the field to be extracted, i.e., the number of LSBs to be excluded. The extract operation is performed only on the second operand, on lines 108. The result of the extract operation is placed on lines 116. Simultaneously, control unit 98 places signals on lines 130 to control the MUX 96 to select line 116 to connect with the output bus 100.

As mentioned above, in accordance with the principles of the present invention, in a VLIW processor the shift left operation and the shift right operation are combined into a single extract instruction, by chaining the shift left unit 56 with the shift right unit 58, that is, by having the shift left unit 56 feed the result directly to the shift right unit 58 over lines 60. In this way, an EXT instruction executes in a single clock cycle. The control unit 98 receives the decoded control signals on lines 120 that indicate an extract instruction is to be performed, and provide the amount by which the shift left is to be, and the amount by which the shift right is to be. The control unit 98 then puts control signals for the shift left operation, on lines 126, and for the shift right operation, on lines 128, in the same cycle. The two operations are then performed in the same cycle, with the output of the shift left unit 56 being passed, on lines 60, to the input of the shift right unit 58 during the cycle.

The form of the instruction may vary. However, it is considered a preferred form to require that the instruction include operands that specify the actual number of bits in the shift left, and the actual number of bits in the subsequent shift right.

Although the present invention and its advantages have been described in detail, it should be understood that various changes, substitutions and alterations can be made herein without departing from the spirit and scope of the invention as defined by the appended claims. For example, referring again to FIG. 1, it will be appreciated that the logic unit 46 and adder 48 may be chained together in a manner similar to that of shift left unit 56 and shift right unit 58, for single cycle execution of data dependent instructions in a VLIW processor. Other combinations of execution units may be conceived, that fall within the scope of the invention as set forth in the appended claims.

What is claimed is:

1. A VLIW microprocessor capable of executing two or more instructions having data dependency in a single cycle, comprising:

an instruction fetch and decode unit;

a register file;

a plurality of execution units communicating with said instruction fetch and decode unit and with said register file; and at least two of said execution units being connected such that the output of a first one of said two execution units is connected to the input of a second one of said two execution units, such that the output of said first execution unit is available as an input to the second execution unit during said single cycle, and such that both execution units can execute in said single cycle, wherein said first execution unit is a shift left unit;

said second execution unit is a shift right unit;

and wherein an extract instruction, involving a shift left operation and a shift right operation executed serially on an operand, can be executed in a single cycle.

2. A VLIW microprocessor capable of executing two or more instructions having data dependency in a single cycle, comprising:

an instruction fetch and decode unit;

a register file;

a plurality of execution units communicating with said instruction fetch and decode unit and with said register file; and at least two of said execution units being connected such that the output of a first one of said two execution units is connected to the input of a second one of said two execution units, such that the output of said first execution unit is available as an input to the second execution unit during said single cycle, and such that both execution units can execute in said single cycle, wherein said first execution unit is a shift right unit;

said second execution unit is a shift left unit;

and wherein an extract instruction, involving a shift right operation and a shift left operation executed serially on an operand, can be executed in a single cycle.

* * * * *